Nov. 2, 1926.  
J. BERGE  
1,605,500  
STEERING WHEEL DRIVE FOR VEHICLE CARRIED MECHANISM  
Filed May 25, 1925  
2 Sheets-Sheet 1
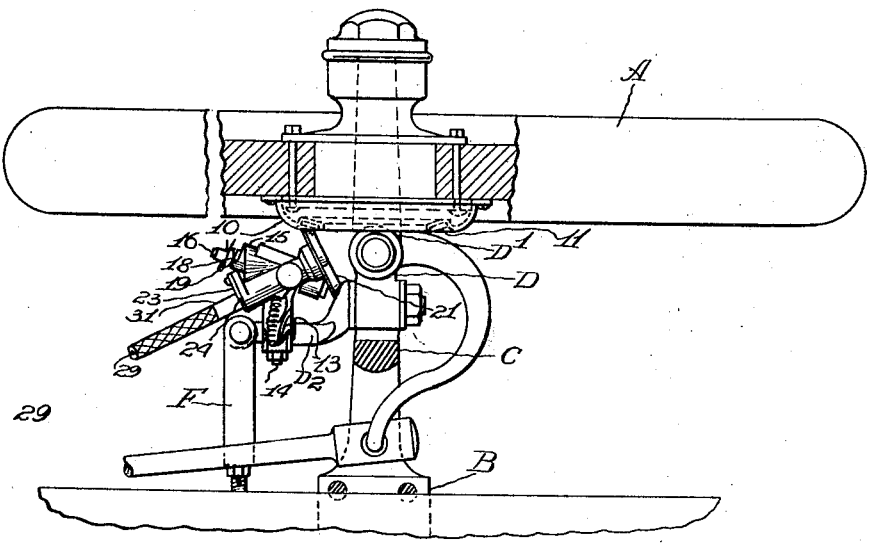
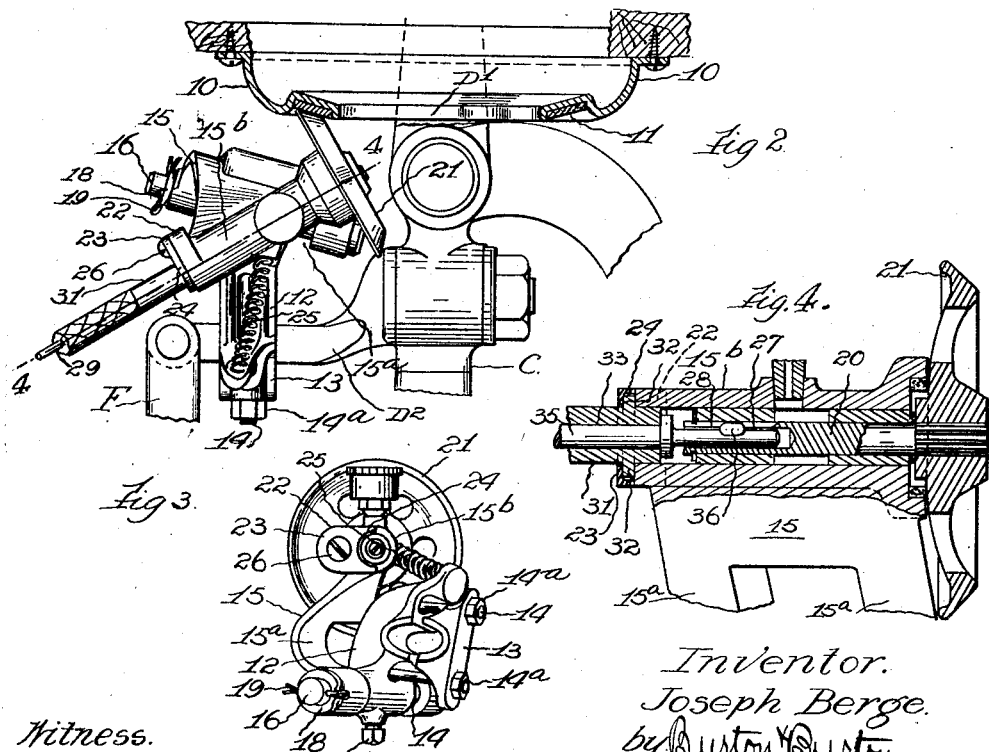
Inventor.
Joseph Berge.

Nov. 2, 1926.
J. BERGE
1,605,500
STEERING WHEEL DRIVE FOR VEHICLE CARRIED MECHANISM
Filed May 25, 1925    2 Sheets-Sheet 2
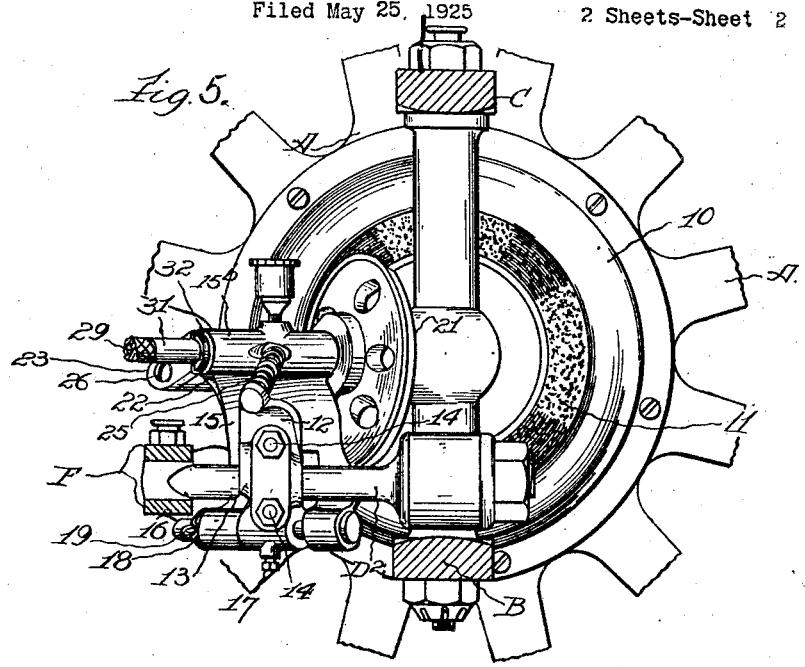
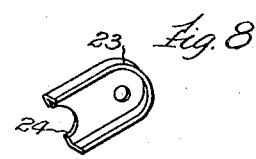
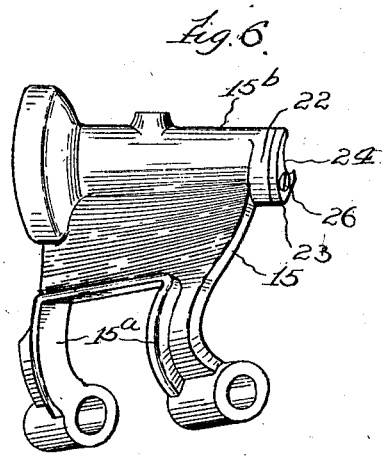
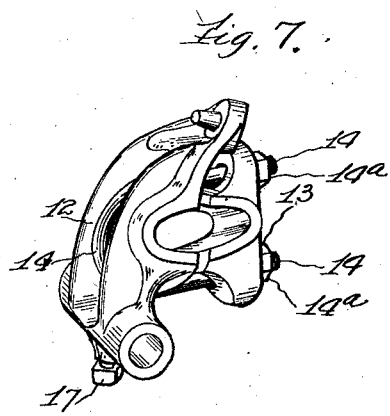
Inventor.
Joseph Berge.
by Burton & Burton
his Attorneys.
Witness
H. T. McKnight Patented Nov. 2, 1926.

1,605,500

UNITED STATES PATENT OFFICE.

JOSEPH BERGE, OF MONTCLAIR, NEW JERSEY, ASSIGNOR TO STEWART-WARNER SPEEDOMETER CORPORATION, OF CHICAGO, ILLINOIS, A CORPORATION OF VIRGINIA.

STEERING-WHEEL DRIVE FOR VEHICLE-CARRIED MECHANISM.

Application filed May 25, 1925. Serial No. 32,823.

The purpose of this invention is to provide an improved construction for driving an auxiliary mechanism carried by a vehicle, such for example as a speedometer or odometer from the vehicle steering wheel, particularly designed and adapted for driving by frictional engagement of a driving member on the steering wheel and the driving member of the device, and also particularly adapted, regardless of the frictional driving, for adjustment to vary the speed ratio between the co-operating driving and driven elements to compensate for variation in the effective diameter of the steering wheel as that diameter is varied by changes in the diameter of the tire, resulting either from wear or substitution. It consists in the elements and features of construction shown and described as indicated in the claims.

In the drawings:—

Figure 1 is a top plan view of the portion of the vehicle comprising one of the steering wheels and the adjacent frame structure with the device embodying the invention mounted in an operative position thereon.

Figure 2 is an enlargement of a portion of Figure 1.

Figure 3 is an elevation, showing the parts characteristic of the invention, as seen from the rear.

Figure 4 is a section at the line 4—4 on Figure 2,—axial with respect to the steering wheel and the driving wheel of the device.

Figure 5 is an elevation of the part shown in Figure 1 on a larger scale and as viewed from inner side of the vehicle wheel, the rim and tire of the wheel being omitted.

Figure 6 is a perspective view of one of the two brackets which constitute the frame structure of the characteristic parts of the invention.

Figure 7 is a perspective view of the other of said frame parts designed to be clamped on the steering lever arm of the steering wheel knuckle member.

Figure 8 is a perspective view of a sheet metal stamping for securing the flexible shaft in place.

The drawings show a customary or conventional type of vehicle steering wheel, and mounting therefor upon one member of the steering wheel knuckle having the spindle upon which the steering wheel is journaled. A is the steering wheel; B the fixed axle terminating in the fixed member C of the knuckle; D is the pivoted member of the knuckle having the steering wheel spindle $D^1$ and the steering lever arm $D^2$, the latter projecting substantially horizontally rearward for connection in the usual manner by the cross link F with the corresponding lever arm of the knuckle of the opposite steering wheel not shown. Upon the steering wheel, A, there is mounted a driving annulus, 10, which in the form shown in the principal figures is a beveled friction annulus of which the friction surface is seen at 11. On the steering lever arm, $D^2$, of the knuckle member, D, there is mounted a bracket, 12, 13, comprising a main member, 12, and a clamp member, 13, the two parts being clamped together by a U bolt, 14, with nuts, $14^a$, $14^a$, for embracing the steering lever arm, $D^2$, at a portion thereof which extends substantially directly fore and aft and of substantially uniform cross section over said portion, so that the bracket may be adjusted along said portion of the steering arm and clamped securely in adjusted position. To the bracket, 12, 13, and specifically to the member, 12, thereof, there is pivoted a bracket, 15, having the end by which it is thus pivoted forked for embracing the bracket member, 12, the fork arms being seen at $15^a$, $15^a$, and indicated as spaced somewhat more widely than the dimension of the bracket member, 12, at the part thereof through which the pivot bolt, 16, extends, said bracket member, 12, being secured to said pivot bolt by set screw, 17, and being adjustable along the bolt to the extent of the excess of the spacing of the fork arms, $15^a$, over the dimension of the bracket member, 12, along the axis of the bolt, the pivotal action being by the turning of the bolt in the fork arms, $15^a$, $15^a$, the bolt being held against longitudinal movement by a spring washer, 18, at one end of the bolt back of a cotter pin, 19, which secures the bolt positively. The bracket, 15, in the normal position of the device when mounted upon the steering lever arm, extends in general upward from the pivot of the two bracket members 12 and 15 at the bolt, 16, and at the upper end of said bracket, 15, it has an extended journal bearing, 15$^b$, which extends longitudinally transversely of the axis of the pivot of the two brackets with each other at the bolt, 16. In this journal bearing there is journaled the spindle or shaft, 20, of a wheel, 21, which as shown is a beveled friction wheel designed and adapted, when the construction is assembled, for co-operating with the driving annulus, 10, carried by the steering wheel. For such co-operation the angular relation of the steering lever arm, D$^2$, the axis of the pivot bolt, 16, and the axis of the journal bearing, 15$^b$, is in general that, assuming the lever arm, D$^2$, to be extending horizontally rearward, the axis of the pivot bolt, 16, is oblique to the vertical fore and aft plane of the said lever arm and slightly inclined down rearwardly with respect to the assumed horizontal position of said lever arm; and that the axis of the journal bearing, 15$^b$, is in a plane offset upwardly as stated from the axis of said pivot bolt, and having substantially the same downward and rearward inclination as said pivot bolt axis, said journal bearing having its axis in said plane extending obliquely rearward and inward with respect to the vehicle, the angle of obliquity being approximately 45 degrees to the direction of said pivot bolt axis. From this description of the construction is will be understood that the bracket, 15, is adapted to rock over its pivot to the bracket member, 12, to carry the driven gear, 21, toward and from the driving annulus, 10; and there is interposed between the two brackets at the upper part of each a compression spring, 25, reacting to separate the brackets at their upper end for yieldingly thrusting the driven wheel, 21, toward the driving annulus, 10; and the angular relation above described in general terms between the directly fore and aft extending steering lever arm, the axis of the pivot bolt, 16, and the axis of the journal bearing, 15$^b$, are designed for this result in view of the angle of the bevel of the driving annulus, 10; and upon consideration of this purpose it will be understood that the obliquity of the axis of the pivotal connection between the two brackets,—the axis of the pivot bolt, 16,—to the fore and aft extending steering lever arm, is substantially the bevel angle of said beveled driving annulus; and it will be further understood upon considering the construction and said purpose, that the angle of obliquity of the journal bearing of the driven wheel, 21 to the axis of the pivot of the two brackets is substantially the bevel angle of said driven wheel, which in the structure as shown in the drawings, is substantially 45 degrees.

The journal bearing, 15$^b$, and the end of the spindle, 20, of said driven wheel 21 are adapted respectively for engaging the casing, 28, and the rotating shaft member, 29, of the flexible shaft adapted to be connected to the structure for transmitting drive to the auxiliary mechanism for whose driving the device is provided, the same being mounted on the vehicle at any convenient position not shown, but which may be understood to be in the most preferred position of speedometer mounted on the vehicle, namely, at the dash near the seat of the driver toward which position the journal bearing of the driven wheel spindle is directed by reason of the angular relations above specified, and the bevel angles of the driving annulus and driven wheel; and it may be understood that in any case in which the steering lever arm, D$^2$, extends otherwise than horizontally in fore and aft direction, the point of engagement of the driving annulus and driven wheel will be above or below horizontal plane through the axis of the steering wheel spindle according as said lever arm diverges rearwardly, upwardly or downwardly from horizontal position. The means of coupling the flexible shaft casing to the journal bearing, 15$^b$, and the rotating shaft member of the flexible shaft to the spindle, 20, may be of any convenient or customary character for such connections; but the construction shown in the drawings in considered to be particularly suitable consisting, in respect to the coupling of the casing to the journal bearing, in providing said casing with a terminal, 31, exteriorly diametered for entering the bore of the journal bearing,—that is, being substantially of the diameter of the bearing bushings, 20$^a$, 20$^b$, spindle, 21, and axially bored as seen at 33,—and providing said terminal at a short distance back from its end with a transversely projecting annular flange, 32, and forming the journal bearing at the end opposite the wheel, 21, with a transversely projecting lug, 22, and providing for mounting upon such lug a sheet metal stamping 23, having a marginal flange, 24, substantially as wide as the thickness of the annular flange, 32, said flange forming a channel at the inner side of said stamping as wide as the diameter of said flange, 32, said stamping having at one end a semi-circular notch, 25, diametered to span the casing terminal, 31, back of the annular flange, 32. This stamping, it will be understood, is designed to be applied to the lug, 22, with the edge of its flange seating on the face of the lug, 22, and secured by a screw, 26, the stamping thus applied after the casing terminal has been inserted in the end of the journal bearing to which it is fitted, and thereby serving to retain the flexible shaft casing in connection with the journal bearing. For engaging the rotating member, 35, of the flexible shaft with the spindle, 20, of the wheel, 21, said spindle is axially bored and longitudinally slotted as seen at 28, and the rotating shaft member of the flexible shaft has its terminal, 35, reduced in diameter as seen at 27, for entering the axial bore of the spindle, and has the driving key projection, 36, which enters the slot, 28, of the spindle.

I claim:—

1. A steering wheel drive for vehicle-carried mechanisms comprising a beveled friction annulus adapted for mounting fixedly on the steering wheel concentric therewith; a bracket adapted for mounting adjustably therealong on the steering lever arm of the wheel-carrying member of the steering wheel knuckle; a second bracket pivoted to the first bracket with its pivotal axis oblique to the vertical plane of the portion of the steering lever arm along which the first bracket is adjustable; a beveled friction wheel journaled on said second bracket with its journal axis offset upwardly from said pivot axis and obliquely transverse thereto, the journal bearing of said friction wheel and the shaft of said wheel journaled therein being adapted for coupling to said shaft and journal bearing respectively, a flexible shaft and its casing, and a spring reacting between the two brackets for yieldingly holding the beveled friction wheel in operative contact with the beveled friction annulus.

2. In the construction defined in claim 1, foregoing, the angle of obliquity of the axis of the pivot of the second bracket to the first to the trend of the lever arm on which the first bracket is adjustably mounted being substantially that of the bevel of the friction annulus carried by the steering wheel.

3. In the construction defined in claim 1, foregoing, the angle of obliquity of the journal axis of the friction wheel to the vertical plane of the axis of the pivot of the two brackets to each other being such as to cause the rocking of the second bracket about its pivot to the first to carry the friction bevel of the friction wheel which is journaled in the second bracket in a line normal to both said bevels at their points of contact.

4. In the construction defined in claim 1, foregoing, the brackets and friction annulus and friction wheel being dimensioned and the two angles of obliquity mentioned being adapted to cause the frictional contact of the friction pulley with the friction annulus to occur below the horizontal plane of the steering wheel axis.

5. A steering wheel drive for vehicle-carried mechanisms, comprising a driving annulus adapted for mounting fixedly on the steering wheel concentric therewith; a bracket for mounting adjustably there-along on the steering lever arm of the wheel-carrying member of the steering wheel knuckle; a second bracket pivoted to the first bracket with its pivotal axis oblique to the vertical plane of the portion of the steering lever arm along which the first bracket is adjustable; a wheel adapted to be driven by said driving annulus, journaled on said second bracket with its journal axis offset axially from said pivot axis and obliquely transverse thereto; the journal bearing of said driven wheel and the shaft thereof in said journal bearing being adapted for coupling a flexible shaft and its casing to said shaft and journal bearing respectively, and a spring reacting between the two brackets for yieldingly holding said driven wheel in operative relation to the driving annulus.

6. In the construction defined in claim 5, foregoing, the angle of obliquity of the driven axis of the driven wheel to the vertical plane of the axis of the pivot of the two brackets to each other being such as to cause the rocking of the second bracket about its pivot to the first to carry the zone of engagement of the driven wheel toward the cooperating zone of the driving annulus in a path normal to both said cooperating zones at their points of contact with each other.

7. In the construction defined in claim 5, foregoing, the brackets, the driving annulus, the driven wheel, and the two angles of obliquity mentioned being dimensioned for causing the engagement of the driven wheel with the driving annulus to occur below the horizontal plane of the steering wheel axis.

In testimony whereof, I have hereunto set my hand, this 20th day of May, 1925.

JOSEPH BERGE.